United States Patent
Yawata (10) Patent No.: US 10,622,015 B2
(45) Date of Patent: Apr. 14, 2020

(54) MOTOR HAVING A HOLLOW SHAFT WITH A RECESS IN AN INNER PERIPHERAL SURFACE OF THE HOLLOW SHAFT, AND A SEALING MEMBER CLOSING AN OPENING OF THE HOLLOW SHAFT AND PARTIALLY FITTED IN THE RECESS

(71) Applicant: NIDEC CORPORATION, Kyoto (JP)

(72) Inventor: Atsushi Yawata, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/174,289

(22) Filed: Oct. 30, 2018

(65) Prior Publication Data

US 2019/0165637 A1 May 30, 2019

(30) Foreign Application Priority Data

Nov. 24, 2017 (JP) ................................. 2017-225774

(51) Int. Cl.
  *G11B 19/20* (2006.01)
  *H02K 5/167* (2006.01)
  *F16C 17/02* (2006.01)

(52) U.S. Cl.
  CPC ....... *G11B 19/2036* (2013.01); *H02K 5/1677* (2013.01); *F16C 17/02* (2013.01); *F16C 2370/12* (2013.01); *H02K 2205/09* (2013.01)

(58) Field of Classification Search
  None
  See application file for complete search history.

(56) References Cited

U.S. PATENT DOCUMENTS

| | | | | |
|---|---|---|---|---|
| 5,559,651 A | * | 9/1996 | Grantz et al. ........ | G11B 17/022 360/99.08 |
| 6,059,459 A | * | 5/2000 | Ichiyama ........... | G11B 19/2018 384/112 |
| 6,118,620 A | * | 9/2000 | Grantz et al. ...... | G11B 19/2009 360/99.08 |
| 6,144,523 A | * | 11/2000 | Murthy et al. ..... | G11B 19/2009 360/99.08 |

(Continued)

FOREIGN PATENT DOCUMENTS

JP  H6-197486 A  7/1994
JP  H7-53407 Y2  12/1995

(Continued)

*Primary Examiner* — Craig A. Renner
(74) *Attorney, Agent, or Firm* — Hauptman Ham, LLP (57) ABSTRACT

A hollow shaft includes a hollow portion extending in an axial direction from an opening that is open at one end of the hollow shaft in the axial direction. The hollow shaft further includes a first communicating hole establishing radial communication between the hollow portion and an axial space between an upper lubricating oil and a lower lubricating oil. The hollow shaft further includes a second communicating hole establishing radial communication between the hollow portion and an unsealed space inside the motor. The unsealed space is connected to an external space outside the motor. The hollow shaft further includes a sealing member closing the opening. The hollow shaft has, in an inner peripheral surface facing the hollow portion, a recess recessed radially outward. A part of the sealing member is fitted into the recess.

13 Claims, 7 Drawing Sheets

(56) References Cited

U.S. PATENT DOCUMENTS

| | | | | |
|---|---|---|---|---|
| 2003/0132676 A1* | 7/2003 | Hirose et al. | ...... | G11B 19/2018 310/90 |
| 2004/0175062 A1* | 9/2004 | Nishimura et al. | ... | F16C 17/107 384/110 |
| 2004/0184188 A1* | 9/2004 | Asada et al. | ....... | G11B 19/2009 360/99.08 |
| 2008/0124012 A1* | 5/2008 | Drautz | .................. | F16C 17/107 384/110 |
| 2012/0162818 A1* | 6/2012 | Sugi et al. | ......... | G11B 19/2009 360/99.08 |
| 2015/0179212 A1* | 6/2015 | Sugi et al. | ......... | G11B 19/2009 360/99.12 |

FOREIGN PATENT DOCUMENTS

| | | |
|---|---|---|
| JP | 2000-92799 A | 3/2000 |
| JP | 2001-248634 A | 9/2001 |
| JP | 2004-301154 A | 10/2004 |
| JP | 2004-304972 A | 10/2004 |

* cited by examiner

MOTOR HAVING A HOLLOW SHAFT WITH A RECESS IN AN INNER PERIPHERAL SURFACE OF THE HOLLOW SHAFT, AND A SEALING MEMBER CLOSING AN OPENING OF THE HOLLOW SHAFT AND PARTIALLY FITTED IN THE RECESS

RELATED APPLICATIONS

The present application claims priority to Japanese Application No. 2017-225774 filed Nov. 24, 2017, the disclosure of which is hereby incorporated by reference herein in its entirety.

FIELD

The present disclosure relates to a motor.

BACKGROUND

Hard disk apparatuses and optical disk apparatuses are equipped with a motor for rotating a disk. A motor is described in, for example, JP-A 2001-248634. The motor described in JP-A 2001-248634 includes a pair of radial dynamic bearing portions each constituted of a radial dynamic bearing groove and a lubricant with which a radial minute gap is filled. A gas interposed portion is formed at a middle portion between the radial dynamic bearing portions. A ventilating hole is provided inside a shaft of the motor along an axial line so as to extend from a lower end to a position of the gas interposed portion. An upper end of the ventilating hole communicates with the gas interposed portion through a communicating hole. A part of the communicating hole communicates with the outside of the motor. In addition, a lower end opening of the communicating hole is closed with a plug such as a rubber ball.

According to the structure described in JP-A 2001-248634, a disturbance is caused in assembling or driving the motor, so that stress is applied to the shaft or the rubber ball. As a result, there is a possibility that the rubber ball is not fully fixed to the shaft. If a gap forms between the rubber ball and the shaft, there is a possibility that dirt or dust enters the shaft or the dynamic bearing portion.

SUMMARY

At least one embodiment of the present disclosure includes a structure capable of, when stress is applied to a shaft or a sealing member for closing an opening of the shaft, suppressing unsatisfactory fixation of the sealing member to the shaft and suppressing intrusion of dirt or dust into the shaft or a dynamic bearing portion.

At least one embodiment of the present disclosure relates to a motor including a stationary portion including a stator and a hollow shaft arranged to extend along a central axis extending in a vertical direction. The motor further includes a rotating portion including a magnet arranged opposite to the stator. The rotating portion is rotatable about the central axis with respect to the stationary portion. The motor further includes a bearing portion including an upper bearing portion and a lower bearing portion spaced apart from each other in an axial direction. The hollow shaft and the rotating portion are arranged opposite to each other with a gap where a lubricating oil is interposed therebetween, in the bearing portion. The lubricating oil includes an upper lubricating oil placed on the upper bearing portion; and a lower lubricating oil placed on the lower bearing portion. The hollow shaft includes a hollow portion arranged to extend in the axial direction from an opening that is open at one end of the hollow shaft in the axial direction. The hollow shaft further includes a first communicating hole arranged to establish radial communication between the hollow portion and an axial space between the upper lubricating oil and the lower lubricating oil in the gap. The hollow shaft further includes a second communicating hole arranged to establish radial communication between the hollow portion and an unsealed space inside the motor. The unsealed space is connected to an external space of the motor. The hollow shaft further includes a sealing member arranged to close the opening. The hollow shaft has, in an inner peripheral surface facing the hollow portion, at least one recess recessed radially outward, and a part of the sealing member is fitted into the at least one recess.

According to at least one embodiment of the present disclosure, the hollow shaft has, in the inner peripheral surface facing the hollow portion, the recess recessed radially outward. A part of the sealing member for closing the opening of the hollow shaft is fitted into the recess. This arrangement helps to suppress unsatisfactory fixation of the sealing member to the shaft at the time when stress is applied to the shaft and the sealing member. This results in suppression of intrusion of dirt or dust into the shaft or the bearing portion.

The above and other elements, features, steps, characteristics and advantages of embodiment of the present disclosure will become more apparent from the following detailed description of embodiments with reference to the attached drawings.

DETAILED DESCRIPTION

Hereinafter, embodiments of the present disclosure will be described with reference to the accompanying drawings. In the description a direction parallel to a central axis of a motor is referred to by the term "axial direction", "axial", or "axially"; directions perpendicular to the central axis of the motor are referred to by the term "radial direction", "radial", or "radially"; and a direction along a circular arc centered on the central axis of the motor is referred to by the term "circumferential direction", "circumferential", or "circumferentially". Also in the description, the shape of each member or portion and relative positions of different members or portions will be described based on the axial direction as a vertical direction and a clamp side where a disk is held down is defined as an upper side with respect to a stator. One of ordinary skill in the art would understand, however, that the above definition of the vertical direction does not restrict in any way the orientations of the motor and the disk drive apparatus according to the present invention when in use. Also the wording "parallel direction" as used in the present description comprehends substantially parallel directions. Also the wording "perpendicular direction" as used in the present description comprehends substantially perpendicular directions.

1-1. Structure of Disk Drive Apparatus

Figure 1:
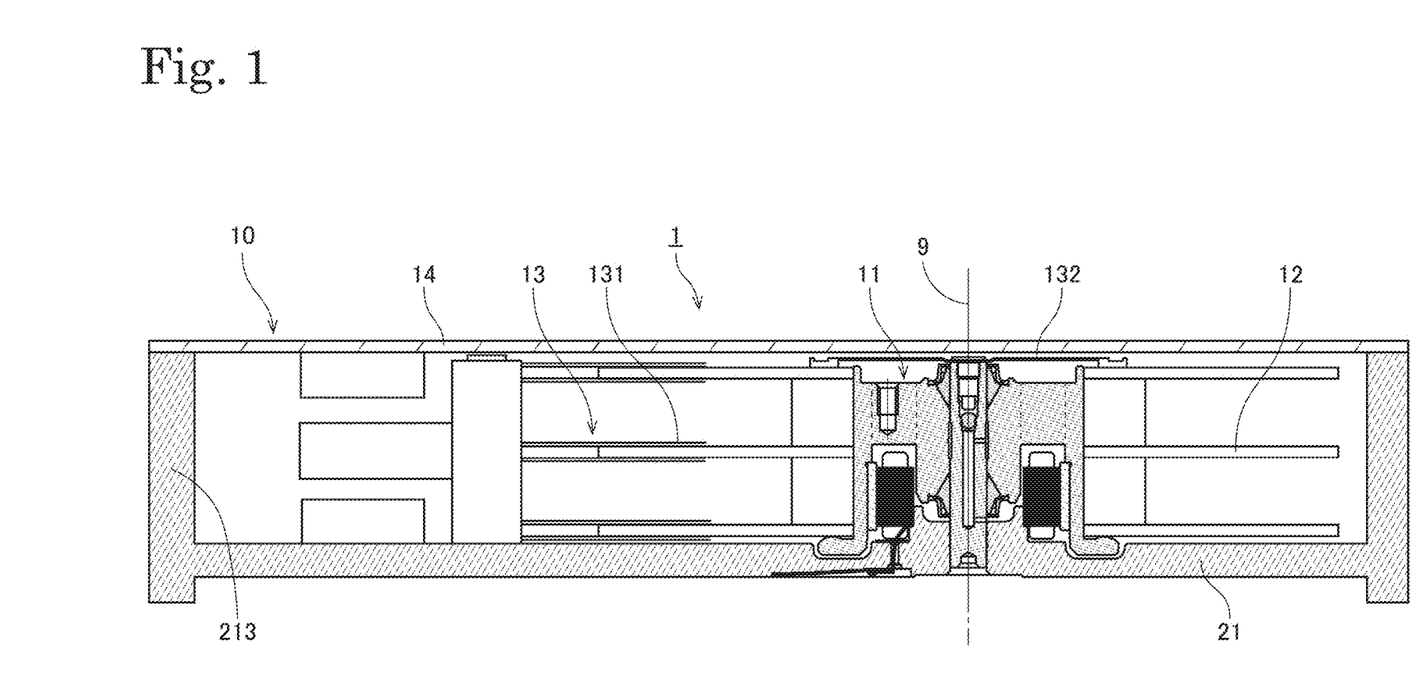
FIG. 1 is a longitudinal sectional view of a disk drive apparatus according to at least one embodiment.

FIG. 1 is a longitudinal sectional view of a disk drive apparatus 1 according to at least one embodiment. The disk drive apparatus 1 is an apparatus that reads and writes information from and into a magnetic disk 12 having a circular hole in a center, while rotating the magnetic disk 12. In FIG. 1, the disk drive apparatus 1 includes a motor 11, three magnetic disks 12, an access portion 13, and a cover 14 that constitutes a part of a housing 10.

The motor 11 causes the magnetic disks 12 to rotate about a central axis 9 extending in the vertical direction, while supporting the magnetic disks 12. The motor 11 includes a base portion 21 a part of which extends in the radial direction at a position below the magnetic disks 12. At least a part of the motor 11, the magnetic disks 12, and the access portion 13 are accommodated inside the housing 10 constituted of the base portion 21 and the cover 14. The access portion 13 moves a head 131 along a recording surface of each magnetic disk 12 to perform at least one of read and write of information from and into the magnetic disk 12. In at least one embodiment, the number of magnetic disks 12 in the disk drive apparatus 1 may be equal to or less than two or may be equal to or more than four.

The housing 10 has an internal space with which clean air having almost no dust or dirt is filled. This clean air reduces the resistance of gas to the access portion 13. However, the internal space may be filled with helium gas, hydrogen gas, or nitrogen gas, in place of air. In at least one embodiment, the internal space may be filled with a mixed gas of these gases with clean air. A joint between the base portion 21 and the cover 14 is sealed with a sealing material such as an elastomer. This keeps the internal space of the housing airtight.

1-2. Structure of Motor

Figure 2:
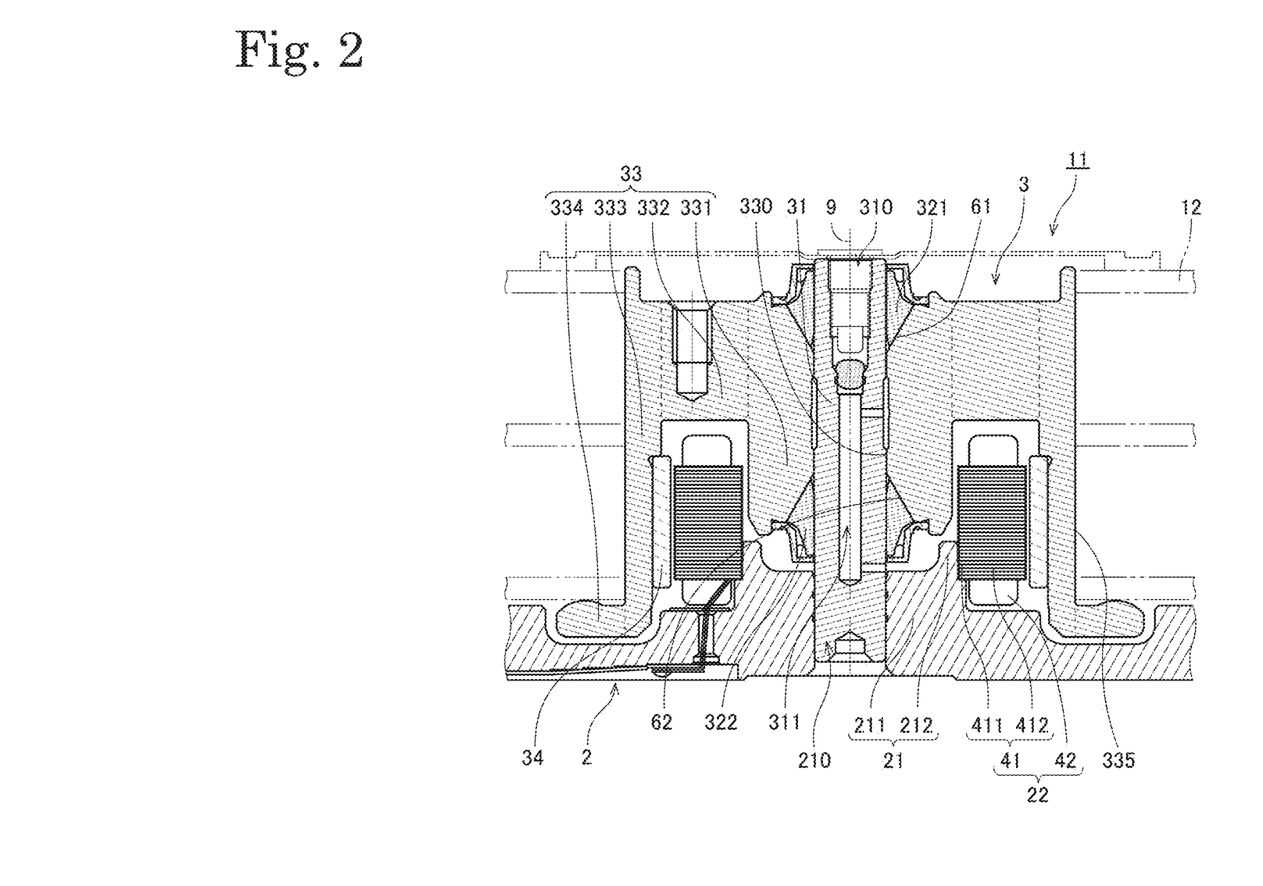
FIG. 2 is a longitudinal sectional view of a motor according to at least one embodiment.

Next, a more specific structure of the motor 11 will be described. FIG. 2 is a longitudinal sectional view of the motor 11 according to at least one embodiment. Referring to FIG. 2, the motor 11 includes a stationary portion 2, a rotating portion 3, and a bearing portion which will be described later. The stationary portion 2 is stationary relative to the housing 10 of the disk drive apparatus 1. The rotating portion 3 is supported through the bearing portion, which will be described later, to be rotatable about the central axis 9 with respect to the stationary portion 2.

The stationary portion 2 according to at least one embodiment includes the base portion 21, a stator 22, a hollow shaft 31, an upper annular portion 321, and a lower annular portion 322.

The base portion 21 supports the stator 22 which will be described later. A metal, such as an aluminum alloy or stainless steel, for example, is used as a material of the base portion 21. The base portion 21 includes a base bottom plate portion 211, a base cylindrical portion 212, and a base sidewall portion 213 (see FIG. 1). The base bottom plate portion 211, the base cylindrical portion 212, and the base sidewall portion 213 are formed continuously.

The base bottom plate portion 211 is a portion that extends substantially in the shape of a disk in a direction perpendicular to the central axis 9 at a position below the rotating portion 3 which will be described later and the magnetic disks 12. In addition, a circuit board for supplying a drive current to the motor 11 is disposed on a lower surface of the base bottom plate portion 211 according to the present preferred embodiment. The base cylindrical portion 212 is a portion that extends substantially in the shape of a cylinder and also extends upward from a part of an upper surface of the base bottom plate portion 211. In addition, the base cylindrical portion 212 is arranged substantially coaxially with the central axis 9. The base sidewall portion 213 is a portion that extends in the axial direction on a radially outer side of the rotating portion 3 which will be described later, the magnetic disks 12, and the access portion 13. An upper end portion of the base sidewall portion 213 is fixed to a lower surface of a radially outer end portion of the cover 14.

The stator 22 is an armature that includes a stator core 41 and a plurality of coils 42. The stator 22 is placed above at least a part of the base portion 21. The stator core 41 is defined by laminated steel sheets, that is, electromagnetic steel sheets such as silicon steel sheets placed one upon another in the axial direction, for example. The stator core is directly supported by the base portion 21 in such a manner that the stator core 41 is fixed to an outer peripheral surface of the base cylindrical portion 212 with, for example, an adhesive. In at least one embodiment, the stator 22 may be indirectly supported by the base portion 21 through a different member (not illustrated).

The stator core 41 includes an annular core back 411 and a plurality of teeth 412 that project radially outward from the core back 411. The plurality of coils 42 are an aggregate of conducting wires wound around the plurality of teeth 412. A drive current for the motor 11 is supplied from an external power supply (not illustrated) to the coils 42 via the circuit board described above and the conducting wires. The plurality of teeth 412 and the plurality of coils 42 are arranged at substantially regular intervals in an annular shape in the circumferential direction having a center on the central axis 9, according to at least one embodiment.

The hollow shaft 31 is a member that is arranged along the central axis 9 and extends in the axial direction at a radially inner side of the rotating portion 3 which will be described later. A hollow portion 311 is provided in a radially inner side of the hollow shaft 31 at a position around the central axis 9. The hollow portion 311 extends axially downward from an opening 310 that is open at an upper end portion of the hollow shaft 31. A screw retaining hole is formed in the upper end portion of the hollow portion 311 including the opening 310, and a screw is inserted into the screw retaining hole to fix a clamp 132 (see FIG. 1) for holding down the magnetic disks 12. The hollow shaft 31 is inserted into a through hole 210 in the base bottom plate portion 211, and is fixed by caulking or adhesion to the base bottom plate portion 211. A metal, such as stainless steel, for example, is used as a material of the hollow shaft 31. The material of the hollow shaft 31 may be either a magnetic material or a non-magnetic material. An outer peripheral surface of the hollow shaft 31 and an inner peripheral surface 330 of a hub 33 of the rotating portion 3 which will be described later are opposite to each other in the radial direction with a slight gap interposed therebetween. A more specific structure of the hollow shaft 31 will be described later.

The upper annular portion 321 is a member that is fixed to an upper side of the outer peripheral surface of the hollow shaft 31 and projects radially outward over the entire periphery of the hollow shaft 31. The lower annular portion 322 is a member that is fixed to a lower side of the outer peripheral surface of the hollow shaft 31 and projects radially outward over the entire periphery the hollow shaft 31. Each of the upper annular portion 321 and the lower annular portion 322 is fixed by press-fitting to the hollow shaft 31 with an adhesive, for example. In at least one embodiment, each of the upper annular portion 321 and the lower annular portion 322 may be fixed to the hollow shaft 31 only by press-fitting or only with the adhesive. In at least one embodiment, each of the upper annular portion 321 and the lower annular portion 322 may be fixed to the hollow shaft 31 by another method such as shrink-fitting. In at least one embodiment, the hollow shaft 31 may be formed integrally with the upper annular portion 321 or the lower annular portion 322.

Figure 3:
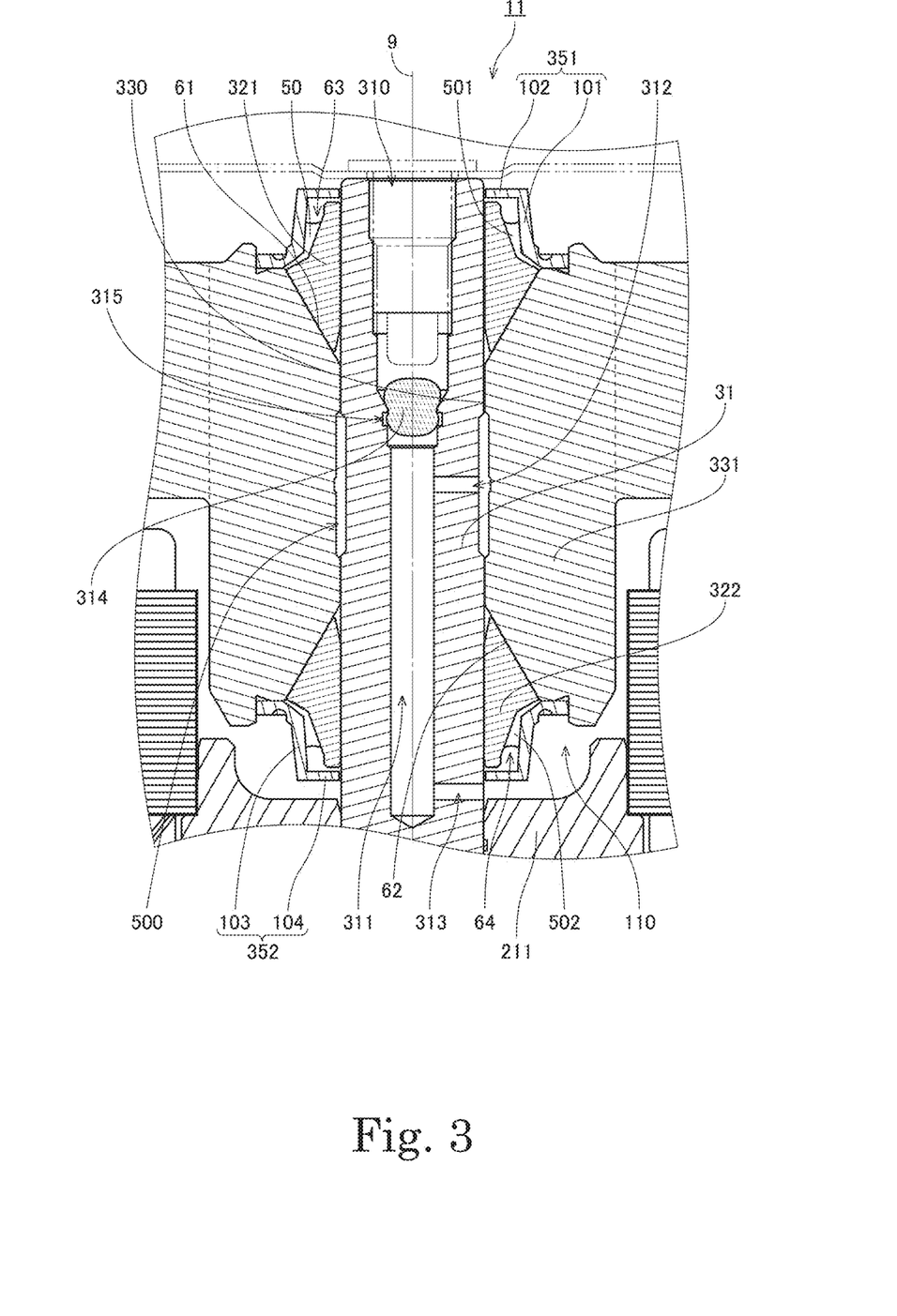
FIG. 3 is a partial longitudinal sectional view of the motor according to at least one embodiment.

FIG. 3 is a partial longitudinal sectional view of the motor 11 according to at least one embodiment. Referring to FIGS. 2 and 3, a lower side of an outer peripheral surface of the upper annular portion 321 and an upper slanting surface 61 of a sleeve portion 331 which will be described later are opposite to each other with a slight gap interposed therebetween in an oblique direction. In addition, an upper side of an outer peripheral surface of the lower annular portion 322 and a lower slanting surface 62 of the sleeve portion 331 which will be described later are opposite to each other with a slight gap interposed therebetween in the oblique direction.

An upper side of the outer peripheral surface of the upper annular portion 321 and an inner peripheral surface of an upper tubular portion 101 of an upper cap 351 which will be described later are opposite to each other with a slight gap interposed therebetween in the radial direction. In addition, a lower side of the outer peripheral surface of the lower annular portion 322 and an inner peripheral surface of a lower tubular portion 103 of a lower cap 352 which will be described later are opposite to each other with a slight gap interposed therebetween in the radial direction.

The rotating portion 3 according to at least one embodiment includes the hub 33, a magnet 34, the upper cap 351, and the lower cap 352.

The hub 33 includes the sleeve portion 331, a hub tubular portion 332, a yoke portion 333, and a flange portion 334. The sleeve portion 331, the hub tubular portion 332, the yoke portion 333, and the flange portion 334 are formed continuously.

The sleeve portion 331 is a portion that extends in the axial direction in a cylindrical shape at a position around the hollow shaft 31. An upper end portion of the sleeve portion 331 is placed axially above an upper end portion of the base cylindrical portion 212 and an upper end portion of the stator 22. In addition, a lower end portion of the sleeve portion 331 is placed axially below at least a part of the stator 22. Hereinafter, an axially slanting surface on the upper side of the sleeve portion 331 will be described as the "upper slanting surface 61". Moreover, an axially slanting surface on the lower side of the sleeve portion 331 will be described as the "lower slanting surface 62". In at least one embodiment, the sleeve portion 331 may be constituted of a plurality of members.

The hub tubular portion 332 is a portion that extends radially outward around the sleeve portion 331. The hub tubular portion 332 extends in an annular shape at a position above the stator 22.

The yoke portion 333 is a portion that extends axially downward from a radially outer end portion of the hub tubular portion 332 in a cylindrical shape. An outer peripheral surface of the magnet 34 which will be described later is fixed to a lower side of an inner peripheral surface of the yoke portion 333. The yoke portion 333 is arranged substantially coaxially with the central axis 9. A ferromagnetic body, such as iron, is used as a material of the hub 33 including the yoke portion 333. This arrangement helps to prevent a magnetic flux generated from the magnet 34, which will be described later, from escaping to the outside. An outer peripheral surface 335 of the yoke portion 333 is fitted into a circular hole in each magnetic disk 12. At least a part of an inner peripheral portion of each magnetic disk 12 is in contact with the outer peripheral surface 335 of the yoke portion 333. With this, the magnetic disks 12 are supported while being positioned in the radial direction.

The flange portion 334 is a portion that extends radially outward from a lower end portion of the yoke portion 333. The magnetic disks 12 are disposed above the flange portion 334. A lower surface of a lower one of the magnetic disks 12 is in contact with at least a part of an upper surface of the flange portion 334. With this, the magnetic disks 12 are supported while being positioned in the axial direction.

The magnet 34 is fixed to the lower side of the inner peripheral surface of the yoke portion 333 with, for example, an adhesive. An annular permanent magnet is used as the magnet 34 according to at least one embodiment. The magnet 34 is formed in a substantially cylindrical shape, and is placed radially outside the stator 22. An inner peripheral surface of the magnet 34 and radially outer end surfaces of the teeth 412 of the stator 22 are opposite to each other in the radial direction with a slight gap interposed therebetween. In addition, the inner peripheral surface of the magnet 34 includes north poles and south poles arranged to alternate with each other in the circumferential direction. In at least one embodiment, a plurality of magnets may be used instead of the annular magnet 34. In the case of using the plurality of magnets, the lower side of the inner peripheral surface of the yoke portion 333 may include north poles and south poles such that the magnetic pole surfaces of the north poles and the magnetic pole surfaces of the south poles are arranged to alternate in the circumferential direction.

The upper cap 351 is a member that extends radially inward from the upper end portion of the sleeve portion 331. An upper end portion of the upper cap 351 is placed below the upper end portion of the hollow shaft 31. The upper cap 351 includes the upper tubular portion 101 and an upper flat plate portion 102. The upper tubular portion 101 is fixed at a position near the upper end portion of the sleeve portion 331 and extends upward in the axial direction in an annular shape. The upper flat plate portion 102 extends radially inward from a position near the upper end portion of the upper tubular portion 101.

The lower cap 352 is a member that extends radially inward from the lower end portion of the sleeve portion 331. A lower end portion of the lower cap 352 is placed above an upper end portion of a part of the hollow shaft 31, the part being placed radially inside the base bottom plate portion 211. The lower cap 352 includes the lower tubular portion 103 and a lower flat plate portion 104. The lower tubular portion 103 is fixed at a position near the lower end portion of the sleeve portion 331 and extends downward in the axial direction in an annular shape. The lower flat plate portion 104 extends radially inward from a position near the lower end portion of the lower tubular portion 103.

A structure of the bearing portion will be described later.

In the motor 11, when a drive current is supplied to the coils 42 via the circuit board described above, a magnetic flux is generated at the plurality of teeth 412. Then, interaction between the magnetic flux of the teeth 412 and the magnetic flux of the magnet 34 produces a circumferential torque between the stationary portion 2 and the rotating portion 3. As a result, the rotating portion 3 rotates about the central axis 9 with respect to the stationary portion 2. In addition, the magnetic disks 12 mounted on the hub 33 also rotate about the central axis 9 together with the rotating portion 3.

1-3. Structure of Bearing Portion

Next, a structure of the bearing portion will be described.

As described above, the stationary portion 2 including the hollow shaft 31, the upper annular portion 321, and the lower annular portion 322 and the rotating portion 3 including the sleeve portion 331, the upper cap 351, and the lower cap 352 are opposite to each other with a gap interposed therebetween. The gap is filled with a lubricating oil 50. A dynamic groove (not illustrated) is provided in the inner peripheral surface 330, the upper slanting surface 61, the lower slanting surface 62, and the like of the sleeve portion 331. At the time when the motor 11 rotates, the dynamic groove (not illustrated) induces fluid dynamic pressure in the lubricating oil 50. With this arrangement, the rotating portion 3 is supported by the stationary portion 2 to rotate stably. That is, in at least one embodiment, the bearing portion includes the hollow shaft 31, the upper annular portion 321, and the lower annular portion 322 that are stationary portion members. The hub 33 including the sleeve portion 331, the upper cap 351, and the lower cap 352 that are rotating portion members. The lubricating oil 50 in the gap between the stationary portion members and the rotating portion members.

In at least one embodiment, the lubricating oil 50 fills the gap between the upper side of the outer peripheral surface of the upper annular portion 321 and the inner peripheral surface of the upper tubular portion 101 of the upper cap 351, the gap between the lower side of the outer peripheral surface of the upper annular portion 321 and the upper slanting surface 61 of the sleeve portion 331. In at least one embodiment, the lubricating oil 50 fills the gap between the outer peripheral surface of the hollow shaft 31 and the upper side of the inner peripheral surface 330 of the sleeve portion 331. The lubricating oil 50 also fills the gap between the outer peripheral surface of the hollow shaft 31 and the lower side of the inner peripheral surface 330 of the sleeve portion 331, the gap between the upper side of the outer peripheral surface of the lower annular portion 322 and the lower slanting surface 62 of the sleeve portion 331. The lubricating oil 50 also fills the gap between the lower side of the outer peripheral surface of the lower annular portion 322 and the inner peripheral surface of the lower tubular portion 103 of the lower cap 352. However, the lubricating oil 50 does not fill a gap between the outer peripheral surface of the hollow shaft 31 and a position near an axially center of the inner peripheral surface 330 of the sleeve portion 331 is a space (an oilless space 500).

As described above, in at least one embodiment, the bearing portion has a so-called partial fill structure in which the lubricating oil 50 separately exists at two or more positions in the gap where the stationary portion 2 and the rotating portion 3 are opposite to each other. Different regions of the lubricating oil 50 include an upper lubricating oil 501 existing above an axially central portion of the sleeve portion 331, and a lower lubricating oil 502 existing below the axially central portion of the sleeve portion 331. While the lubricating oil 50 is the same in both regions, according to at least one embodiment, the upper lubricating oil 501 and the lower lubricating oil 502 are terms used to identify lubricating oil 50 located in different portions of the gap. An upper interface of the upper lubricating oil 501 overlaps with the upper tubular portion 101 of the upper cap 351 in the radial direction. A lower interface of the lower lubricating oil 502 overlaps with the lower tubular portion 103 of the lower cap 352 in the radial direction.

That is, the bearing portion includes an upper bearing portion 63 and a lower bearing portion 64 that are spaced apart from each other in the axial direction. The upper bearing portion 63 includes the stationary portion members including an axially upper-side part of the hollow shaft 31, and the upper annular portion 321. The upper bearing portion 63 further includes the rotating portion members including a part of the sleeve portion 331, the part above the axially central portion, and the upper cap 351. The upper lubricating oil 501 is in the upper bearing portion 63. The lower bearing portion 64 includes the stationary portion members including an axially lower-side part of the hollow shaft 31, and the lower annular portion 322. The lower bearing portion 64 further includes the rotating portion members including a part of the sleeve portion 331, the part below the axially central portion, and the lower cap 352. The lower lubricating oil 502 is in the lower bearing portion 64.

1-4. Structure of Hollow Shaft

Next, a structure of the hollow shaft 31 will be described.

As described above, the hollow portion 311 is provided around the central axis 9 at the radially inner side of the hollow shaft 31. The hollow portion 311 extends axially downward from the opening 310 that is open at the upper end portion of the hollow shaft 31. The hollow shaft 31 is provided with a first communicating hole 312 and a second communicating hole 313. The first communicating hole 312 and the second communicating hole 313 respectively penetrate through the hollow shaft 31 in the radial direction at positions spaced apart from each other in the axial direction. The first communicating hole 312 establishes radial communication between the hollow portion 311 and the axial oilless space 500 placed between the upper lubricating oil 501 and the lower lubricating oil 502. The second communicating hole 313 establishes radial communication between the hollow portion 311 and an internal space 110 of the motor 11 including the gap between the lower surface of the lower flat plate portion 104 of the lower cap 352 and the upper surface of the base bottom plate portion 211. The internal space 110 is an unsealed space connected to an external space of the motor 11 via the periphery of the stator 22. However, the positional relationships among the hollow portion 311, the first communicating hole 312, and the second communicating hole 313 are not limited thereto. For example, the hollow portion 311 may extend axially upward from an opening (not illustrated) that is open at a lower end portion of the hollow shaft 31. That is, the hollow portion 311 may extend in the axial direction from an opening that is open at one end portion of the hollow shaft 31 in the axial direction.

With this arrangement, air in the gap where the stationary portion 2 and the rotating portion 3 are opposite to each other, including the oilless space 500 described above flows into the external space via the hollow portion 311, the first communicating hole 312, and the second communicating hole 313. As a result, the pressure near the interface above the upper lubricating oil 501 becomes almost equal to the pressure near the interface below the upper lubricating oil 501. In addition, the pressure near the interface above the lower lubricating oil 502 becomes almost equal to the pressure near the interface below the lower lubricating oil 502. This arrangement helps to suppress movement and leakage of each of the upper lubricating oil 501 and the lower lubricating oil 502 resulting from a difference between the pressure near the upper interface and the pressure near the lower interface.

The hollow portion 311 is formed in such a manner that a columnar drill is inserted in the axial direction into an upper end portion of a columnar member serving as a base material of the hollow shaft 31, for example. In at least one embodiment, each of the first communicating hole 312 and the second communicating hole 313 is formed in such a manner that a small-diameter, columnar drill is inserted in the radial direction into a part of the outer peripheral surface of the hollow shaft 31. After the formation of the hollow portion 311, first communicating hole 312, and second communicating hole 313, a screw retaining hole is formed in such a manner that a female screw groove (not illustrated) is cut near the upper end portion of the hollow portion 311 including the opening 310. In at least one embodiment, the opening 310 is closed with a sealing member 314 (rubber ball) which will be described later, before a screw for fixing the clamp 132 described above is inserted into the screw retaining hole. This arrangement helps to suppress intrusion of dirt or dust into the hollow shaft 31 and the bearing portion. As a result, degradation in the hollow shaft 31 and the bearing portion is reduced or avoided.

Figure 4:
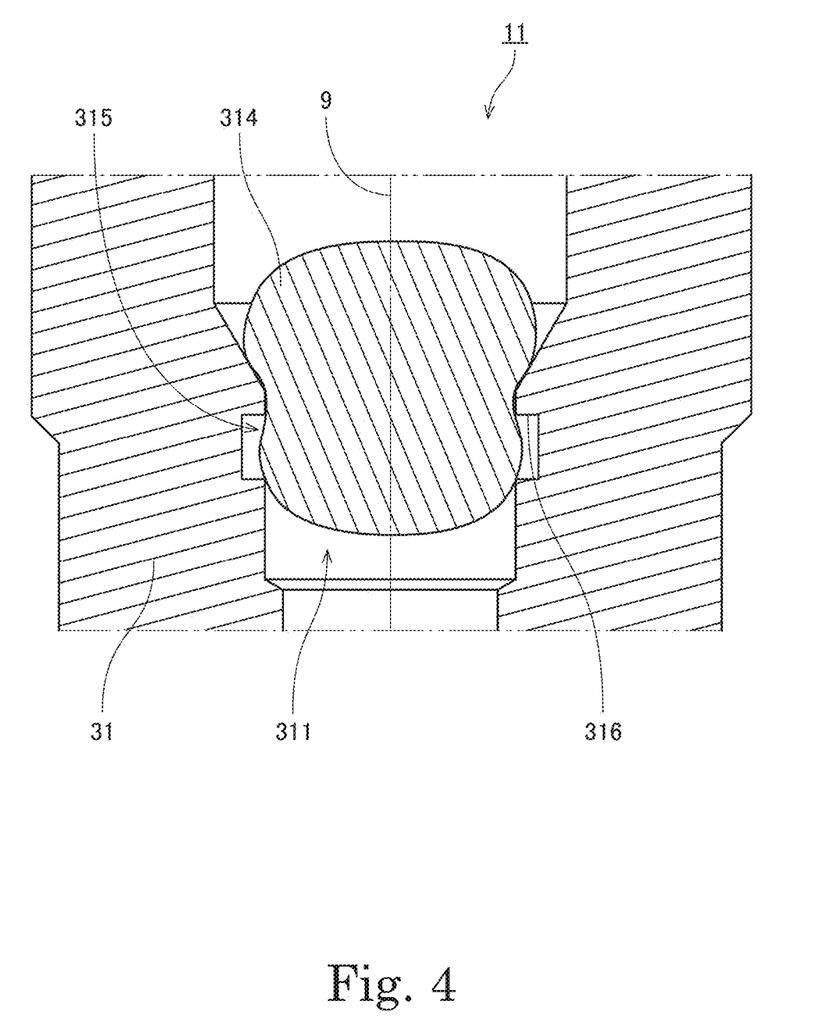
FIG. 4 is a partial longitudinal sectional view of the motor according to at least one embodiment.

FIG. 4 is a partial longitudinal sectional view of the motor 11 according to at least one embodiment. Referring to FIGS. 3 and 4, the hollow shaft 31 further includes the sealing member 314 (rubber ball) for closing the opening 310 at a position axially above the first communicating hole 312. A fluorine-based resin, for example, is used as a material of the sealing member 314. In addition, the sealing member 314 has elasticity and a spherical shape. The hollow shaft 31 also has, in an inner peripheral surface facing the hollow portion 311, a recess 315 that is recessed radially outward. A part of the sealing member 314 is fitted into the recess 315. This arrangement helps to suppress unsatisfactory fixation of the sealing member 314 to the hollow shaft 31 and to suppress separation and removal of the sealing member 314. In addition, closing the hollow portion 311 enables suppression of intrusion of dirt or dust into the hollow shaft 31 and the bearing portion. The shape and number of the sealing member 314 are not limited to the above description. In at least one embodiment, a metal may be used as a material of the sealing member 314.

The recess 315 according to at least one embodiment is provided over the entire periphery of the inner peripheral surface of the hollow shaft 31 in the circumferential direction. A part of the sealing member 314 in the axial direction is fitted into the recess 315 over an entire periphery in the circumferential direction. This arrangement helps to suppress separation or removal of the sealing member 314 from the hollow shaft 31 even when stress is applied to the hollow shaft 31 and the sealing member 314 from every direction because of a disturbance caused in assembling or driving the motor 11. This results in suppression of intrusion of dirt or dust into the hollow shaft 31 and the bearing portion. Since the recess 315 is provided over the entire periphery of the hollow shaft 31 in the circumferential direction, processing for the recess 315 is simplified, resulting in improvement of productivity.

At least a part of an upper side surface 316 is perpendicular to the central axis 9. The upper side surface 316 is one of side surfaces of the recess 315, and is placed axially above the other side surfaces. This arrangement helps to further suppress separation or removal of the sealing member 314 from the hollow shaft 31. In at least one embodiment, since the upper side surface 316 of the recess 315 is formed to be perpendicular to the central axis 9, processing for the recess 315 is simplified, resulting in improvement of productivity.

While the [A1] at least one embodiment is described above, one of ordinary skill in the art would understand that the present disclosure is not limited to the above-described at least one embodiment.

Figure 5:
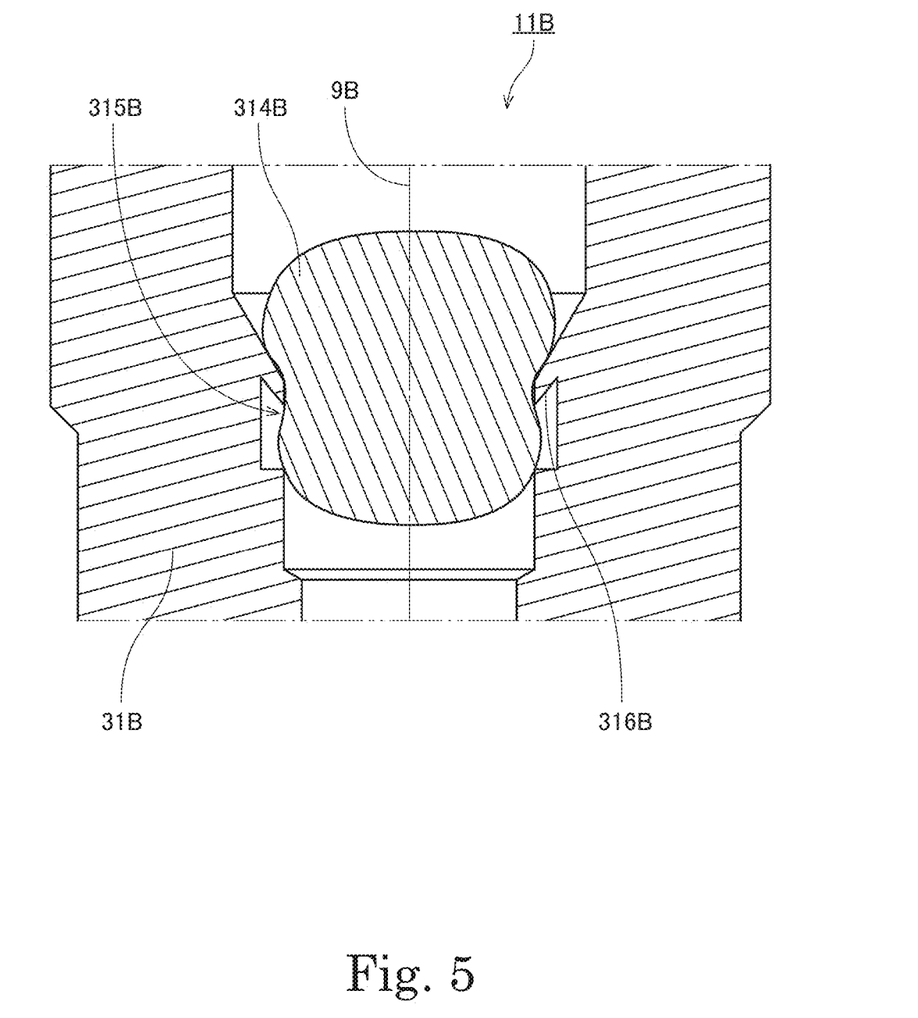
FIG. 5 is a partial longitudinal sectional view of a motor according to at least one embodiment.

FIG. 5 is a partial longitudinal sectional view of a motor 11B according to at least one embodiment. In FIG. 5, at least a part of an upper side surface 316B slants with respect to a central axis 9B. The upper side surface 316B is one of side surfaces of a recess 315B, and is placed axially above the other side surfaces. In addition, an axial position of the upper side surface 316B gradually ascends from a radially inner side toward a radially outer side of a hollow shaft 31B. This arrangement helps to further suppress separation or removal of a sealing member 314B from the hollow shaft 31B.

Figure 6:
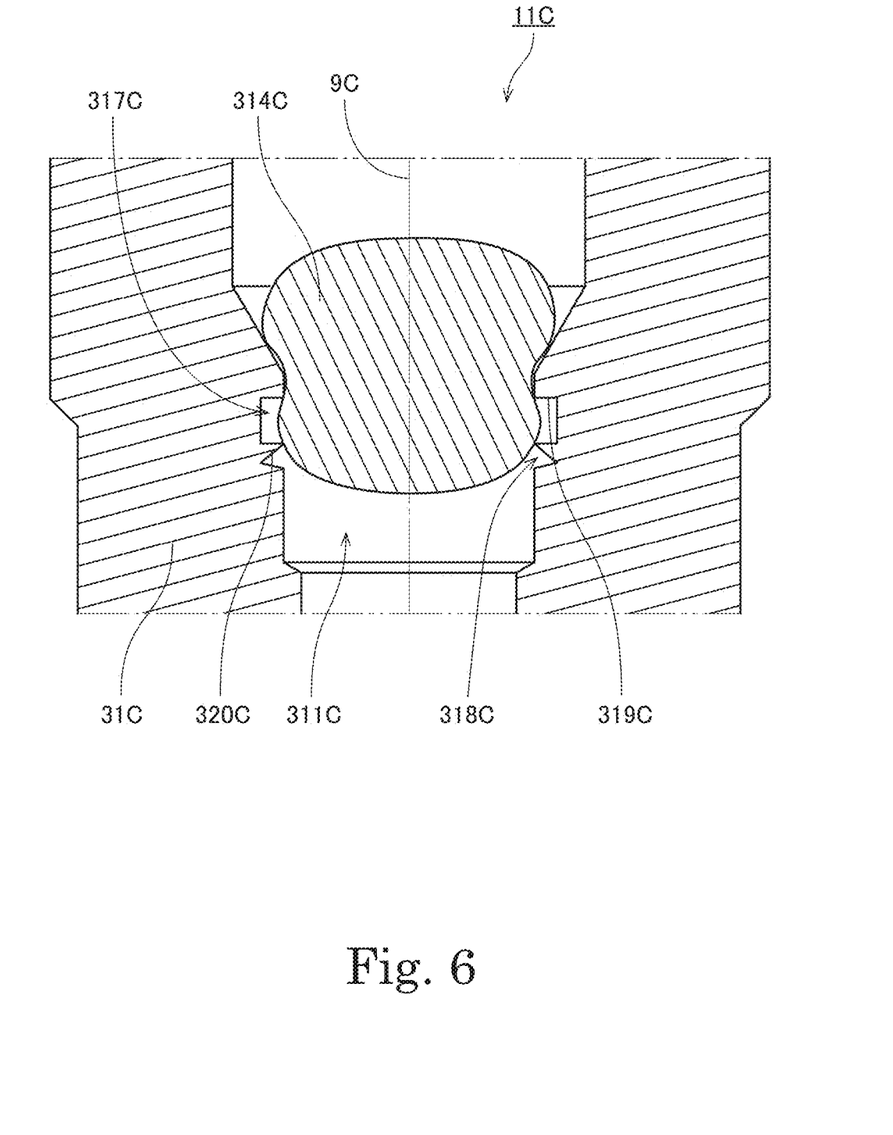
FIG. 6 is a partial longitudinal sectional view of a motor according to at least one embodiment.

FIG. 6 is a partial longitudinal sectional view of a motor 11C according to at least one embodiment. In FIG. 6, a hollow shaft 31C has, in an inner peripheral surface facing a hollow portion 311C, a first recess 317C and a second recess 318C each recessed radially outward. The second recess 318C is placed axially below the first recess 317C. A part of a sealing member 314C is fitted into at least one of the first recess 317C and the second recess 318C.

In FIG. 6, at least a part of a second upper side surface 320C slants with respect to a central axis 9C. The second upper side surface 320C is one of side surfaces of the second recess 318C, and is placed axially above the other side surfaces. In at least one embodiment, an axial position of the second upper side surface 320C gradually descends from a radially inner side toward a radially outer side of the hollow shaft 31C. With this, a part of the sealing member 314C can be easily fitted into at least one of the first recess 317C and the second recess 318C. In at least one embodiment, this slanting surface may be provided in the first recess 317C. That is, in at least one embodiment, one of at least a part of a first upper side surface 319C that is one of the side surfaces of the first recess 317C and is axially above the other side surfaces slants with respect to the central axis 9C, and an axial position thereof gradually descends from a radially inner side toward a radially outer side of the hollow shaft 31C. In at least one embodiment, at least a part of a second upper side surface 320C that is one of side surfaces of the second recess 318C and is axially above the other side surfaces slants with respect to the central axis 9C, and an axial position thereof gradually descends from a radially inner side toward a radially outer side of the hollow shaft 31C. In at least one embodiment, the other one of at least the part of the first upper side surface 319C that is one of the side surfaces of the first recess 317C and is placed axially above the other side surfaces and at least the part of the second upper side surface 320C that is one of the side surfaces of the second recess 318C and is placed axially above the other side surfaces is perpendicular to the central axis 9C.

Figure 7:
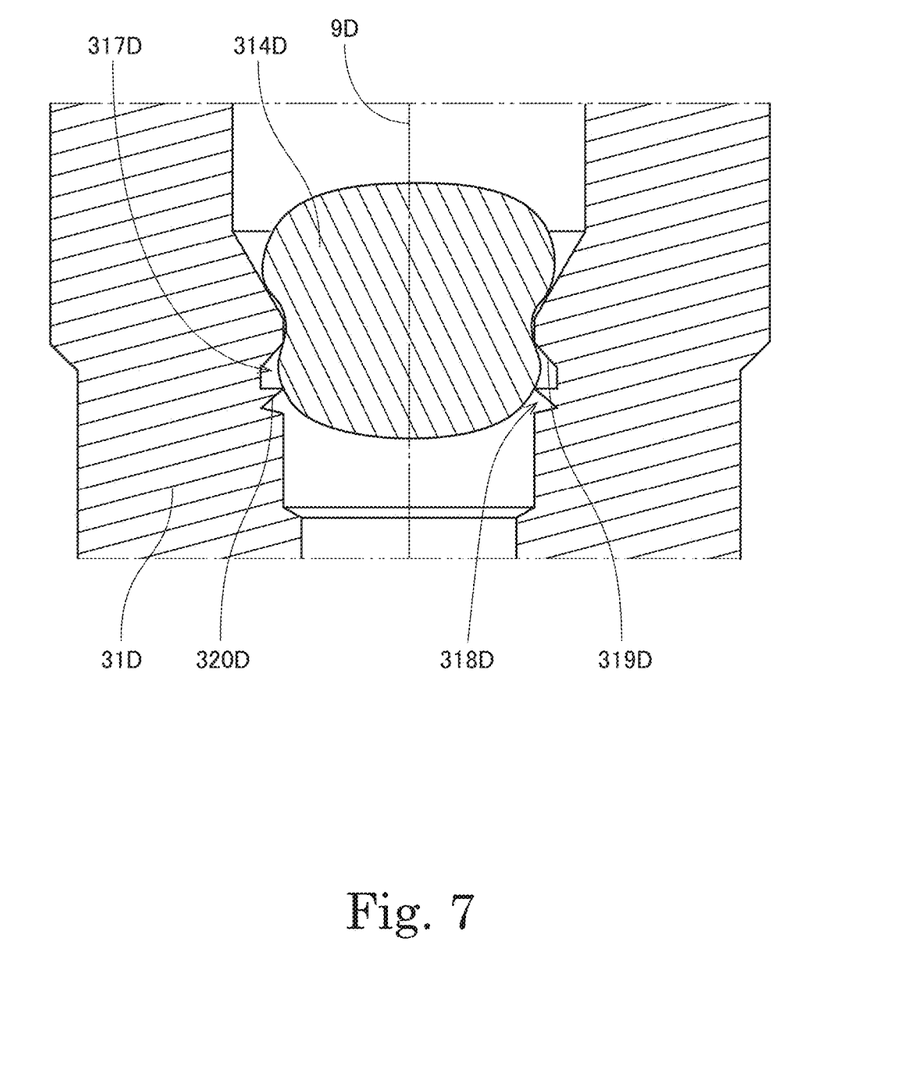
FIG. 7 is a partial longitudinal sectional view of a motor according to at least one embodiment.

As described in FIG. 7, at least a part of a first upper side surface 319D that is one of side surfaces of a first recess 317D and is placed axially above the other side surfaces and at least a part of a second upper side surface 320D that is one of side surfaces of a second recess 318D and is placed axially above the other side surfaces may respectively slant with respect to a central axis 9D, and axial positions thereof may gradually descend from a radially inner side toward a radially outer side of a hollow shaft 31D. With this, a part of a sealing member 314D can be easily fitted into at least one of the first recess 317D and the second recess 318D.

In the above-described embodiments, the recess is provided over the entire periphery of the inner peripheral surface of the hollow shaft in the circumferential direction. In at least one embodiment, the recess may be provided in a part of the inner peripheral surface of the hollow shaft in the circumferential direction. This arrangement helps to reduce an amount of processing for the recess. In at least one embodiment, a plurality of recesses may be provided in the inner peripheral surface of the hollow shaft so as to be spaced apart from one another in the circumferential direction. In at least one embodiment, the recess may extend spirally about the central axis, in the inner peripheral surface of the hollow shaft. This arrangement helps to suppress separation or removal of the sealing member from the hollow shaft even when stress is applied to the hollow shaft and the sealing member from every direction.

An impeller or a flywheel may be used in place of the magnetic disk according to at least one embodiment. The motor according to the present disclosure may be used as a fan motor for supplying an airflow.

In at least one embodiment, the detailed shapes of the motor may be different from the configurations and shapes in the respective drawings of the present disclosure. In at least one embodiment, features of the above-described embodiments may be combined appropriately as long as no conflict arises.

Embodiments of the present disclosure can be used in, for example, a motor.

Features of the above-described embodiments may be combined appropriately as long as no conflict arises.

While embodiments of the present disclosure have been described above, one of ordinary skill in the art would understand that variations and modifications will be apparent to those skilled in the art without departing from the scope and spirit of the present invention. The scope of the present disclosure, therefore, is to be determined solely by the following claims.

What is claimed is:

1. A motor, comprising:
a stationary portion including a stator and a hollow shaft, wherein the hollow shaft extends along a central axis, and the hollow shaft includes:
a hollow portion extending in an axial direction from an opening that is open at one end of the hollow shaft;
a first communicating hole, wherein the first communicating hole establishes communication between the hollow portion and an axial space;
a second communicating hole, wherein the second communicating hole establishes communication between the hollow portion and an unsealed space inside the motor, the unsealed space being connected to an external space outside of the motor; and
a recess in an inner peripheral surface of the hollow shaft, wherein the recess is recessed radially outward;
a rotating portion rotatable about the central axis with respect to the stationary portion; and
a first bearing portion and a second bearing portion, wherein the first bearing portion is spaced from the second bearing portion in the axial direction,
wherein
the hollow shaft and the rotating portion define a gap therebetween, and a lubricating oil is in the gap, in the first bearing portion and second bearing portion,
the lubricating oil includes:
an upper lubricating oil on the first bearing portion; and
a lower lubricating oil on the second bearing portion, wherein the axial space is in the gap between the upper lubricating oil and the lower lubricating oil,
the motor further comprises a sealing member closing the opening, wherein a part of the sealing member is in the recess,
the recess includes a first side surface and another side surface,
a part of the first side surface is perpendicular to the central axis, and
the first side surface is closer to the opening than said another side surface of the recess.

2. The motor according to claim 1, wherein
the recess is a first recess, and
the motor further comprises a second recess, wherein the second recess is axially separated from the first recess.

3. The motor according to claim 2, wherein
the second recess includes a second side surface and a further side surface,
the second side surface of the second recess is closer to the opening than said further side surface of the second recess, and
a part of the second side surface is slanted with respect to the central axis, and an axial position thereof gradually descends from a radially inner side toward a radially outer side of the hollow shaft.

4. The motor according to claim 1, wherein
the recess is in the inner peripheral surface of the hollow shaft in a circumferential direction.

5. The motor according to claim 1, further comprising:
a plurality of recesses in the inner peripheral surface of the hollow shaft, wherein
the recess is one of the plurality of recesses, and
adjacent recesses of the plurality of recesses are spaced apart in a circumferential direction.

6. The motor according to claim 1, wherein
the recess is over an entire periphery of the inner peripheral surface of the hollow shaft in a circumferential direction.

7. The motor according to claim 1, wherein
the sealing member comprises an elastic resin.

8. The motor according to claim 1, wherein
the sealing member comprises a fluorine-based resin.

9. A motor, comprising:
a stationary portion including a stator and a hollow shaft, wherein the hollow shaft extends along a central axis, and the hollow shaft includes:
a hollow portion extending in an axial direction from an opening that is open at one end of the hollow shaft;
a first communicating hole, wherein the first communicating hole establishes communication between the hollow portion and an axial space;
a second communicating hole, wherein the second communicating hole establishes communication between the hollow portion and an unsealed space inside the motor, the unsealed space being connected to an external space outside of the motor; and
at least one recess in an inner peripheral surface of the hollow shaft, wherein the at least one recess is recessed radially outward;
a rotating portion rotatable about the central axis with respect to the stationary portion; and
a first bearing portion and a second bearing portion, wherein the first bearing portion is spaced from the second bearing portion in the axial direction,
wherein
the hollow shaft and the rotating portion define a gap therebetween, and a lubricating oil is in the gap, in the first bearing portion and second bearing portion,
the lubricating oil includes:

an upper lubricating oil on the first bearing portion; and
a lower lubricating oil on the second bearing portion, wherein the axial space is in the gap between the upper lubricating oil and the lower lubricating oil,
the motor further comprises a sealing member closing the opening, wherein a part of the sealing member is in the at least one recess,
the at least one recess includes:
a first recess having a first side surface and another side surface, and
a second recess, wherein the second recess is axially separated from the first recess,
the first side surface of the first recess is closer to the opening than said another side surface of the first recess, and
a part of the first side surface of the first recess is slanted with respect to the central axis, and an axial position thereof gradually descends from a radially inner side toward a radially outer side of the hollow shaft.

10. The motor according to claim 9, wherein
the second recess includes a second side surface and a further side surface,
the second side surface of the second recess is closer to the opening than said further side surface of the second recess, and
a part of the second side surface is perpendicular to the central axis.

11. A disk drive, comprising:
a motor, wherein the motor comprises:
a stationary portion including a stator and a hollow shaft, wherein the hollow shaft extends along a central axis, and the hollow shaft includes:
a hollow portion extending in an axial direction from an opening that is open at one end of the hollow shaft;
a first communicating hole, wherein the first communicating hole establishes radial communication between the hollow portion and an axial space;
a second communicating hole, wherein the second communicating hole establishes radial communication between the hollow portion and an unsealed space inside the motor, the unsealed space being connected to an external space outside of the motor; and
a recess in an inner peripheral surface of the hollow shaft, wherein the recess is recessed radially outward;
a rotating portion rotatable about the central axis with respect to the stationary portion; and
a first bearing portion and a second bearing portion, wherein the first bearing portion is spaced from the second bearing portion in the axial direction,
wherein
the hollow shaft and the rotating portion define a gap therebetween, and a lubricating oil is in the gap, in the first bearing portion and second bearing portion,
the lubricating oil includes:
an upper lubricating oil on the first bearing portion; and
a lower lubricating oil on the second bearing portion, wherein the axial space is in the gap between the upper lubricating oil and the lower lubricating oil,
the motor further comprises a sealing member closing the opening, wherein a part of the sealing member is in the recess,
the recess includes a first side surface and another side surface,
a part of the first side surface is perpendicular to the central axis, and
the first side surface is closer to the opening than said another side surface of the recess; and
a plurality of magnetic disks connected to the rotating portion.

12. The disk drive according to claim 11, wherein
the recess is a first recess, and
the motor further comprises a second recess, wherein the second recess is axially separated from the first recess.

13. The disk drive according to claim 12, wherein
the second recess includes a second side surface and a further side surface,
the second side surface of the second recess is closer to the opening than said further side surface of the second recess, and
a part of the second side surface is slanted with respect to the central axis, and an axial position thereof gradually descends from a radially inner side toward a radially outer side of the hollow shaft.

\* \* \* \* \*